United States Patent Office 3,382,215
Patented May 7, 1968

3,382,215
VIRGIN OLEFIN POLYMERS MODIFIED WITH ORGANIC POLYISOCYANATES
Bernard O. Baum, Plainfield, N.J., assignor to Union Carbide Corporation, a corporation of New York
No Drawing. Continuation of abandoned application Ser. No. 182,918, Mar. 27, 1962. This application July 14, 1967, Ser. No. 653,578
9 Claims. (Cl. 260—77.5)

ABSTRACT OF THE DISCLOSURE

The instant specification discloses adhesives prepared by (1) reacting virgin olefin polymers with organic polyisocyanates or (2) reacting virgin olefin polymers with organic polyisocyanates and organic peroxides. "Virgin" olefin polymers are those which have not been subjected to deliberate oxidation. The polymers of this invention may be used as coating materials, films, or as laminate interlayers.

RELATED APPLICATION

This application is a continuation of copending application Ser. No. 182,918, filed Mar. 27, 1962, now abandoned.

This invention relates to modified olefin polymers exhibiting improved clarity, stress cracking resistance and adhesion to a wide variety of substrates. More particularly, the invention relates to a method for modifying olefin polymers to exhibit one or more of the above characteristics and to olefin polymers so modified.

The term "olefin polymers" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage $>C=C<$ e.g. styrene, vinyl stearate, butene, vinyl acetate, vinyl formate, methyl acrylate, monobutyl maleate, 2-ethyl hexyl acrylate, N-methyl-N-vinyl acetamide, acrylic acid, ethyl acrylate, methacrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred olefin polymers in this invention contain at least 10 percent by weight of a combined alpha mono-olefinically unsaturated hydrocarbon having from 2 to 4 carbon atoms inclusive, i.e. butene-1, propylene and especially ethylene.

Olefin polymers are desirably modified for various end uses, for example, to provide increased molecular weight, higher thermal deformation temperatures, improved clarity and enhanced solvent resistance. Heretofore, such modification has been carried out by crosslinking the olefin polymer as by irradiation, or by treatment with peroxides. Peroxide crosslinking accomplishes the desired improvements in olefin polymers but has undesirable side effects such as the leaving of residues which may adversely affect stability, electrical and permeability properties.

As packaging materials, olefin polymer films are characteristically superior to cellulosic and metallic materials in flexibility, resistance to tear and in being unaffected by moisture and chemically active environments. Cellulosic and metallic packaging materials, however, are generally superior to olefin polymer films in shock-absorbing properties and are more easily handled in automatic packaging machinery. A combination of the properties of these packaging materials is possible by laminating or coating the olefin polymer on the cellulosic or metallic material. The general inertness of the olefin polymers to solvents and adhesives, however, has thus far substantially prevented obtaining of suitable laminated and coated substrates except by costly pretreatment of the olefin polymer surface, e.g. etching with chromic acid, subjecting to corona discharge and flame treatment.

It is an object, therefore, of the present invention to provide olefin polymers exhibiting increased molecular weight, higher thermal deformation temperatures, improved clarity and enhanced solvent resistance and which are not reduced in stability or permeability.

It is another object to provide olefin polymers which exhibit good adhesion to both porous and nonporous substrates without the need of surface treatment of the polymer after shaping which are adapted to use in coating and in laminate constructions.

It is another object to provide a method for modifying olefin polymers to impart increased molecular weight, higher thermal deformation temperature characteristics, improved clarity and enhanced solvent resistance.

It is another object to provide a method for modifying olefin polymers to impart improved adhesional characteristics.

It has now been discovered that surprising and marked adhesional properties are imparted to olefin polymers by reacting the olefin polymer with a polyisocyanate, preferably a normally solid polyisocyanate, an organic compound contatining at least two —N=C=O groups.

It has further been discovered that the joint use of critical amounts of an organic peroxide with a polyisocyanate results in a synergistic improvement in adhesional properties of both virgin olefin polymers and oxidized olefin polymers i.e. olefin polymers having a peroxide content (measured as described below) of from 0.15 to 3.5 milligrams (mg.) peroxide per gram resin and/or an infra-red carbonyl content (also measured as described below) of from 0.0005 to 0.03 carbonyl absorbance per mil resin and also improved physical properties, particularly increased molecular weight, higher thermal deformation temperature characteristics, improved clarity and enhanced solvent resistance.

It has further been discovered that these improved physical properties and marked adhesional properties are imparted to hydroxyl contatining olefin polymers by reacting with a polyisocyanate.

Important and advantageous modifications of olefin polymers can be achieved by the use of non-free-radical crosslinking agents, namely polyisocyanates, which have heretofore been achieved only by the use of free radical type crosslinking agents e.g., peroxides. Moreover, the use of polyisocyanates as crosslinking agents poses none of the problems associated with peroxide crosslinking agents used alone.

A highly surprising and unexpected property of the polyisocyanate reacted olefin polymers of this invention is their marked adhesional properties. These olefin polymers applied as liquids for coating or as film for surfacing various substrates or as laminate interlayers exhibit tenacious adhesion to fibrous, nonfibrous, porous, and nonporous, flexible and rigid, metallic and nonmetallic, polymeric, cellulosic and glass surfaces.

In general, the method of this invention required for imparting adhesional characteristics to olefin polymers mixing to substantial homogenity the olefin polymer and the polyisocyanate and modifying the olefin polymer by reacting the isocyanate groups with the olefin polymer.

In order to modify olefinic hydrocarbon polymers in molecular weight, thermal deformation temperature characteristics, improved clarity and enhanced solvent resistance, it is essential in the method of this invention to mix to substantial homogenity such an olefin polymer with the above peroxide and carbonyl characteristics, the polyisocyanate and the peroxide and crosslink the olefin polymer by reacting the isocyanate and peroxide crosslinking agents with the olefin polymer.

These peroxide and carbonyl values cannot be obtained without deliberate oxidation.

The particular means of achieving oxidation of the olefin polymer is not narrowly critical. Broadly, intimately contacting the olefin polymer with an oxygen containing environment such as air, oxygen, ozone, various catalytic agents, or chemical reagents for a sufficient length of time will result in the oxidation production of certain isocyanate reactive groups. Among these groups are carboxyl, hydroxyl, hydroperoxide and hydrogen groups. Levels of peroxide and/or carbonyl within the above limits are indicative of the presence of suitable amounts of these oxidation produced groups.

A suitable means of producing these groups in olefin polymers is to bubble ozone, or oxygen or a mixture thereof, e.g. 2% ozone in oxygen, through a heated bed e.g. to 60° C. of powdered e.g. 20 mesh, virgin olefin polymer for a sufficient time e.g. for 60 minutes.

This treatment of a virgin ethylene homopolymer which normally has a carbonyl absorbance per mil of 0.0002 and a peroxide content of 0.04 milligram per gram resin results in an oxidized ethylene polymer increased in carbonyl absorbance to 0.003 per mil resin and peroxide content to 1.4 milligrams per gram resin. Also suitable is treating the virgin olefin polymer with an oxidizing chemical e.g., by slurrying powdered resin in heated chromic acid (sulfuric acid-potassium dichromate) for about 30 minutes. The resin should be washed with water afterwards to remove acid and dichromate. This treatment of virgin ethylene homopolymer causes an increase in carbonyl absorbance per mil to 0.005 and in peroxide content to 1.5 milligrams per gram resin.

Still another suitable method of controllably oxidizing ethylene polymers is milling the polymer in air or oxygen containing atmosphere at elevated temperatures e.g., above 110° C. for a sufficient period e.g. 45 minutes. This treatment of ethylene homopolymer causes an increase in carbonyl absorbance to 0.007 per mil and in peroxide content to 1.9 milligrams peroxide per gram resin. Other oxidizing means include agitation in suitably atmospherically controlled apparatus other than roll mills. Oxidation can also be effected by sparging oxygen, air or ozone into a solution of the ethylene polymer.

From the foregoing illustrative means for oxidizing the olefin polymers, it can be seen that in any method wherein heat and oxygen are mutually present with an olefin polymer under conditions insuring a good degree of contact between the polymer and the oxygen, oxidation will take place. It is of course also required that the contacting be carried out for a time sufficient to build up corbonyl absorbance and peroxide content levels to the above set forth minimal values.

By the term "virgin olefin polymers" is meant those olefin polymers which have not been subjected to deliberate oxidation by mechanical working, solvating or chemical reaction in an oxidizing atmosphere. As pointed out above, the oxidation levels needed in the olefin polymers for molecular weight, solvent resistance, clarity and thermal deformation improvement are not present in virgin olefin polymers. Reaction or virgin olefin polymers which have less than these oxidation levels with polyisocyanates does not provide to a significant extent the foregoing improvements but does impart remarkable adhesion properties. In the absence of deliberate oxidation the oxidation level is of olefin polymers are substantially as shown in Table I in which all percentages are by weight and in which the carbonyl absorbance and peroxide content were determined as hereinafter set forth.

It is to be pointed out that hydroxyl (—OH) containing polymers by virtue of having these groups do not require oxidation to the prescribed levels of peroxide content and/or carboxyl absorbance in contradistinction to polymers and copolymers of nonhydroxyl group containing olefins.

Polymers and copolymers of monomers containing mixed functional groups e.g. hydroxyl containing carboxylated olefin monomers and carboxyl containing hydroxylate olefin monomers can also be reacted with the polyisocyanates of this invention with or without peroxides to impart the herein described properties.

TABLE I

| Olefin Polymer | Carbonyl Absorbance per mil [1] | Peroxide Content, mg./gm. resin |
|---|---|---|
| Ethylene homopolymer: | | |
| (0.92 density) | 0.0002 | 0.04 |
| (0.945 density) | 0.0002 | 0.02 |
| Ethylene/carbon monoxide: (94%/6%) | | 0.06 |
| Ethylene/propylene: | | |
| (48%/52%) | | 0.035 |
| (89%/11%) | | 0.045 |
| Ethylene/ethyl acrylate: | | |
| (79%/21%) | | 0.024 |
| (94%/6%) | | 0.05 |
| Ethylene/vinyl acetate (5.6 mole percent vinyl acetate in feed) | | 0.05 |
| Propylene | 0.0002 | 0.04 |

[1] Because olefin polymers may contain bands in the infra red which interfere with the carbonyl band, 5.8-5.85, meaningful infra red data must be in comparison with another sample of the resin e.g. oxidized vs. virgin (differential carbonyl absorbance). Hence carbonyl values in this table are given only for ethylene homopolymers which are devoid of carbonyl or other interfering bands and hence give absolute carbonyl absorbance values.

Preferred means for oxidizing the olefin polymers are mechanical mixing apparatus open to the air such as two roll mills and closed intermeshing gear type apparatus provided with oxygen or air atmosphere. These apparatus especially when heated to between 110° C. to 170° C., depending upon the oxidation susceptibility of the polymer easily bring olefin polymers above (1) the minimum peroxide content of 0.15 milligram peroxide per gram resin and into the preferred peroxide content range of from 0.60 to 2.7 milligrams peroxide per gram resin; and (2) above the minimum differential carbonyl absorbance of 0.0005 per mil resin to within preferred range of 0.001 and above carbonyl absorbance per mil resin. Differential carbonyl absorbance per mil in the case of ethylene homopolymer is equal to the absolute carbonyl absorbance due to the absence of interfering bands in that polymer; with certain ethylene copolymers, however, the differential carbonyl absorbance represents only the relative amounts of carbonyl before and after the oxidation described above.

An advantage of mechanical mixing apparatus is that polyisocyanate and peroxide reactants can be blended with the olefin polymer during oxidizing or just subsequently thereto without the need of further handling of the oxidized polymer. For example, an ethylene polymer can be oxidized by milling 45 minutes at 170° C. in air and the polyisocyanate and peroxide blended in by fluxing the polymer at 110° C., adding the polyisocyanate and peroxide and milling for about 5 minutes or until the additive is uniformly dispersed. In addition to the polyisocyanates and peroxides, there can be incorporated at this point conventional additives, e.g. fillers such as carbon blacks and clays, pigments, catalysts for the isocyanate reaction e.g. dibutyl tin dilaurate, and the like. Other means for incorporating the various additives and crosslinking agents can be employed. The latter can be added during or after oxidation of olefin polymer.

As stated above, it is not necessary to oxidize olefin polymers prior to reaction with polyisocyanates in order to impart great adhesionability to the olefin polymer. There is an advantage, however, to pre-oxidizing the olefin polymer prior to reaction with the polyisocyanates because the resulting adherent polymer is then also improved in other properties which can be useful in a coating or bonding material as described above.

The virgin and oxidized olefin polymers are modified in the practice of this invention with organic polyisocyanates by which term is meant to be included polyisocyanates and polyisothiocyanates of the general formula:

$$R(NCG)_x$$

in which $x$ is an integer of 2 or more, preferably 2 or 3, G is a sulfur or oxygen atom and R is any polyvalent organic radical having a valence of $x$ and in which the valence bonds are from hydrocarbon moieties. For example R can be a single hydrocarbon moiety such as alkylene, substituted alkylene, arylene, substituted arylene, a hydrocarbon or substituted hydrocarbon containing one or more aryl-NCG bonds and one or more alkyl-NCG bonds, a hydrocarbon or substituted hydrocarbon containing a plurality of either aryl-NCG bonds or alkyl-NCG bonds. R can also include radicals such as —R'—Z—R'— wherein Z may be any divalent moiety such as —O—,

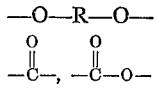

—S—, —S—R—S—, —SO$_2$—, etc., and R' is a divalent hydrocarbon moiety such as alkylene, arylene, substituted alkylene, substituted arylene, aralkylene, alkarylene and the like.

Examples of such compounds include:
ethylene diisocyanate
propylene diisocyanate
butenylene diisocyanate
butylene diisocyanate
thiodiethylene diisocyanate
pentylene diisocyanate
methylbutylene diisocyanate
hexamethylene diisocyanate
dipropyldiisocyanato ether
thiodipropyl diisocyanate
heptamethylene diisocyanate
2,2-dimethylpentylene diisocyanate
3-methoxyhexamethylene diisocyanate
octamethylene diisocyanate
2,2,4-trimethylpentylene diisocyanate
nonamethylene diisocyanate
decamethylene diisocyanate
3-butoxyhexamethylene diisocyanate
1,4-butylene glycol propylether diisocyanate
undecamethylene diisocyanate
dodecamethylene diisocyanate
thiodihexamethylene diisocyanate
1,3-dimethyl benzene diisocyanate
1,4-dimethylbenzene diisocyanate
1,2-dimethylcyclohexane diisocyanate
1,4-dimethylcyclohexane diisocyanate
1,4-diethylbenzene diisocyanate
1,4-dimethylnapthalene diisocyanate
1,5-dimethylnaphthalene diisocyanate
1, methylisocyanate 2-n-propylisocyanate 3,5-dimethylcyclohexane
n-propyl-biphenyl diisocyanate
α,β-(β-ethylisocyanate)-9,10-endoethylene dihydroanthrocene
cyclohexane-1,3-diisocyanate
cyclohexane-1,4-diisocyanate
1-methylcyclohexane-2,4-diisocyanate
1-ethylcyclohexane-2,4-diisocyanate
dicyclohexylmethane-4,4'-diisocyanate
dicyclohexylmethylmethane-4,4'-diisocyanate
dicyclohexyldimethylmethane-4,4'-diisocyanate
2,2-dimethyldicyclohexylmethane-4,4'diisocyanate
3,3'-5,5'-tetramethyldicyclohexylmethane-4,4'-diisocyanate
4-phenylisocyanatemethylisocyanate
4-phenylisocyanate-β-ethylisocyanate
3-phenylisocyanate-α-ethylisocyanate
3-phenylisocyanate-α-propylisocyanate
4-phenylisocyanate-α-propylisocyanate
3-phenylisocyanate-α-butylisocyanate
4-phenylisocyanate-α-butylisocyanate tetrahydronaphthalene,1,5-diisocyanate
1-chlorobenzyl-2,4-diisocyanate
1-nitrobenzyl-1-2,4-diisocyanate
1-nitrobenzyl-2,5-diisocyanate
1,3-dichlorobenzyl-4,6-diisocyanate
1,4-dichlorobenzyl-2,5-diisocyanate
1-chloro-4-methoxybenzyl-2,5-diisocyanate
1-methoxybenzyl-2,4-diisocyanate
1-methoxybenzyl-2,5-diisocyanate
1-methyl-4-methoxybenzyl-2,5-diisocyanate
1-ethoxybenzyl-2,4-diisocyanate
1,3-dimethoxybenzyl-4,6-diisocyanate
1,4-dimethoxybenzyl-2,5-diisocyanate
1-propoxybenzyl-2,4-diisocyanate
1-isobutoxybenzyl-2,4-diisocyanate
1,4-diethoxybenzyl-2,5-diisocyanate
azobenzyl-4,4'-diisocyanate
2-methylazobenzyl-4,4'-diisocyanate
benzylazonaphthalene-4,4'-diisocyanate
toluene-2,4-diisocyanate
diphenylether-2,4-diisocyanate
diphenylether-4,4'-diisocyanate
dianisidine-diisocyanate
ethylene glycolphenylether-2,2'-diisocyanate
diethylene glycolphenylether-2,2'-diisocyanate
naphthalene-1,4-diisocyanate
naphthalene-1,5-diisocyanate
naphthalene-2,6-diisocyanate
naphthalene-2,7-diisocyanate
1,1'-dinaphthalene-2,2'-diisocyanate
biphenyl-2,4-diisocyanate
biphenyl-4,4'-diisocyanate
3,3'-dimethylbiphenyl-4,4'-diisocyanate
3,3'-dimethoxybiphenyl-4,4'-diisocyanate
2-nitrobiphenyl-4,4'-diisocyanate
diphenylmethane-4,4'-diisocyanate
2,2-dimethyldiphenylmethane-4,4'-diisocyanate
diphenyldimethylmethane-4,4'-diisocyanate
2,5,2'5'tetramethyldiphenylmethane-4,4'diisocyanate
cyclohexyl di-(4-isocyanate-phenyl)-methane
3,3'-dimethoxydiphenylmethane-4,4'-diisocyanate
4,4'-dimethoxydiphenylmethane-3,3'-diisocyanate
4,4'-diethoxydiphenylmethane-3,3'-diisocyanate
2,2'-dimethyl-5,5'-dimethoxydiphenylmethane-4,4'-diisocyanate
3,3'-dichlorodiphenyldimethylmethane-4,4'-diisocyanate
benzophenone-3,3'-diisocyanate
α,-β-diphenylethane-2,4-diisocyanate
3-nitrotriphenylmethane-4,4'-diisocyanate
4-nitrotriphenylmethane-4,4'-diisocyanate
2,5,2',5'-tetramethyltriphenylmethane-4,4'-diisocyanate
fluorene-2,7-diisocyanate
phenanthroquinone-2,6-diisocyanate
9-ethylcarbazol-3,6-diisocyanate
pyrene-3,8-diisocyanate
chrysene-2,8-diisocyanate
diphenylsulfide-2,4-diisocyanate
diphenylsulfide-4,4'-diisocyanate
diphenylsulfone-4,4'-diisocyanate
diphenylmethylsulfone-4,4'-diisocyanate
4-methyldiphenylsulfone-2,4'-diisocyanate
4-methyl-3-isocyanate-benzyl-sulfonyl-4'-isocyanatephenylester
4-methoxy-3-isocyanate-benzyl-sulfonyl-4'-isocyanatephenylester
2,2'-dimethyldiphenylsulfide-5,5'-diisocyanate
3,3'-dimethyldiphenyldisulfide-6,6'-diisocyanate
4,4'-dimethyldiphenyldisulfide-5,5'-diisocyanate
4,4'-dimethyldiphenyldisulfide-3,3'-diisocyanate
4,4'-dimethoxydiphenyldisulfide-3,3'-diisocyanate
3,3'-dimethoxydiphenyldisulfide-4,4'-diisocyanate
4,4-dimethoxydiphenylsulfone-3,3'-diisocyanate
4-methyl-3-isocyanate-benzylsulfonylanalido-4-isocyanate-3-methyl diisocyanate dibenzylsulfonylethylenediamino-4,4'-diisocyanate
3,3'-dimethoxy-4,4'-diisocyanate dibenzylsulfone
4,4'-methoxybenzylethylenedisulfone-3,3'-diisocyanate
4,4'-methoxybenzylethylenediamino-3,3'-diisocyanate
1-methylbenzyl-2,4,6-triisocyanate
1,3,5-trimethylbenzyl-2,4,6-triisocyanate
naphthalene-1,3,7-triisocyanate
diphenylmethane-2,4,4-triisocyanate
3-methyldiphenylmethane-4,6,4'-triisocyanate
4,4'-dimethyldiphenylmethane-2,2',5,5'-tetraisocyanate
triphenylmethane-4,4'-4''-triisocyanate, and
diphenyl-4,4'-diisocyanate-N-carbamyl acid chloride.

Preferred as the organic isocyanate cross-linking agents in this invention are the diisocyanates, particularly the aromatic diisocyanates where the —N=C=O groups are on different ring carbon atoms of the same or different aromatic ring, e.g., 2,4-toluene diisocyanate, dianisidine diisocyanate (3,3' - dimethoxy - 4,4' - biphenylene diisocyanate), bitolylene diisocyanate, tolylene diisocyanate, meta xylylene diisocyanate, and polymethylene polyphenyl isocyanate.

The use of polyisocyanates with virgin olefin polymers in virtually any concentration is productive of adhesion ability and generally favorable modification of polymer properties. The concentration of polyisocyanate should not exceed, however, 40 percent by weight based on the virgin olefin polymer as olefin polymer properties are lost to the composition. Conversely use of less than about 0.01 percent by weight polyisocyanate based on the olefin polymer confers only negligible alteration of the olefin polymers. Above 0.25 percent by weight and particularly above about 0.5 percent by weight of polyisocyanate based on the olefin polymer imparts significant property improvement. The improvement in olefin polymer properties from about 0.5 to about 20 percent by weight of polyisocyanate based on the olefin polymer is not proportionately increased by further increasing the polyisocyanate concentration to between 20 and 40 percent by weight. Hence, concentrations of polyisocyanate between 0.5 to 20 percent by weight are preferred. A particularly desirable balance of improved olefin polymer properties are achieved by the use of from about 3 to about 10% of a polyisocyanate having two —N=C=O groups and 1 to 6% of a polyisocyanate having three or more —N=C=O groups based on the olefin polymer and, hence, this concentration of these modifying agents is particularly preferred. By the term "polyisocyanate," mixtures of two or more polyisocyanates are meant to be included.

Among the modifications of olefin polymers caused by reaction with peroxides and the isocyanates in accordance with this invention, one of the most important is an increase in the gel content of the polymer. This property is a measure of the resistance to swelling of an olefin polymer when in contact with solvents; and resistance to swelling is an index to solvent resistance. Thus, as percent gel increases, solvent resistance increases. The gel content is an index to other properties of the crosslinked olefin polymers also. For example, resins having greater than about 10% gel content are improved in clarity over uncrosslinked olefin polymer, hence this amount of gel is highly desirable. For most end-use applications a greater solvent resistance and higher molecular weight is desirable and the olefin polymer should have at least 15% gel content. Also, higher gel content generally means greater stress crack resistance. On the other hand, the surprising adhesional characteristics of the crosslinked polymers of this invention are apparent in resins containing no measurable gel content, i.e. 0% gel; this property improves with increasing gel content.

The amount of gel formation is closely related to the degree of oxidation. For example, gel appears only when a resin having a carbonyl absorbance per mil of above 0.0005 is reacted with a polyisocyanate; a doubling of carbonyl absorbance to 0.001 results in a sextupling of percent gel formation.

The practice of the present invention is illustrated by the following examples wherein all parts and percentages are by weight unless otherwise specified.

Percent gel was determined by immersing a 0.3 gram piece of a 20 mil, cured, crosslinked plaque of olefin polymer enclosed in a 100 mesh copper wire cage, in refluxing ethylbenzene for 16 hours. The cage and contents after this period were dried at 110° C. for 3 hours. The weight of the resin in the cage divided by 0.3 and multiplied by 100 was the percent gel.

Clarity was empirically determined by looking through a 20 mil plaque.

Melt flow was determined according to ASTM D-1238-57T. As provided therein, 1P melt flow refers to the decigrams of resin extruded in one minute through a standard orifice at 190° C. and 44 pounds per square inch pressure; 10P melt flow is the value found at 190° C. and 440 pounds per square inch pressure.

Carbonyl absorbance per mil was determined by infra red techniques using a 20 mil plaque. Measurements were made at 5.84 microns and absorbance per mil calculated according to the equation:

$$\text{absorbance/mil} = \frac{\log \frac{I_o}{I}}{t}$$

where $t$ = thickness in mils
$I_o$ = incident radiation, percent transmission
$I$ = transmitted radiation, percent transmission Apparatus used was a Perkin-Elmer Model 21 double beam infra red spectrophotometer.

The carbonyl absorbance per mil of all olefin polymers except ethylene homopolymers was measured as differential absorbance by placing an equally thick sample of virgin resin into the reference beam while the oxidized polymer sample was in the sample beam. Thus, the carbonyl measured was that formed by the oxidation step.

Peroxide content was determined by weighing 0.500± 0.001 gram of finely divided polyethylene (powdered to 20 mesh) into an 8 by 1 inch pressure tube; pipetting 25 ml. of alcohol-stabilized tetrachloroethylene into a 50 ml. graduate and adding 7 ml. of a one percent solution of sodium iodide in methanol. This was mixed and added to the resin in the pressure tube which was then capped. Heat at 130° C. was applied for five minutes. The tubes were removed and cooled in Dry Ice for three minutes. Five milliliters of the methanol-iodine layer was pipetted off. The transmission was measured in a Beckman DU spectrophotometer at 450 and 600 mμ using the methanol-iodide solution as a blank.

The sodium iodide in methanol was made up as follows: 1.00 gram of sodium iodide was dissolved in 100 grams (125 cc.) of distilled methanol which had been made acid by addition of a drop of phosphoric acid.

Peroxide content was then calculated from the formula:

$\frac{A}{B} \times 100$ = corrected percent transmission at 450 mμ

$A$ = percent transmission at 450 mμ
$B$ = percent transmission at 600 mμ

TABLE II.—VARIATION OF LIGHT TRANSMISSION WITH PEROXIDE CONTENT IN POLYETHYLENE

| Milligrams peroxidic oxygen/gram resin | Log of percent light transmission (450 mμ, 10 mm. light path) |
|---|---|
| 0.05 | 67 |
| 0.1 | 44.5 |
| 0.15 | 29.5 |
| 0.2 | 19.5 |
| 0.25 | 15.0 |

Using the corrected transmission from the above table for the milligrams of peroxidic oxygen per gram resin, the peroxide content is calculated from the equation:

$M/S$ = peroxide oxygen, mg. per gm. resin
$M$ = mg. peroxidic oxygen from chart
$S$ = sample weight Stress cracking resistance was measured as follows:

A compression molded and cured polymer specimen 0.5 inch wide by 1.5 inches long and 125 mils thick was slit 20 mils deep along its length for 75 mils. The specimen was bent 180° and with 9 similar samples in a channel holder immersed in a non-ionic surfactant, nonyl phenoxy polyoxyethylene ethanol, at 50° C. Usually two channel holders were used, providing 20 specimens per test. Failure of a specimen was the appearance of a crack perpendicular to the slit. $F_{50}$ is time of failure of 10 samples of the 20 (i.e. 50% failure).

For convenience, 2,4-toluene diisocyanate is denoted by TDI and dianisidine diisocyanate by DADI.

Example 1.—Improvement in adhesion properties of virgin polyethylene by reacting with polyisocyanates Ethylene homopolymer having a density of 0.92 and a melt index of 2.1, unoxidized, was mixed with 6% of a diisocyanate by adding the diisocyanate to the ethylene homopolymer while being fluxed on a two roll mill. A 10 mil film was removed from the rolls and placed between a 20 mil thick sheet of polyethylene and a solvent washed, cold rolled steel panel. The assembly was placed between cellophane wrapped polished platens and cured under 500 pounds/sq. in. at 170° C. for 10 minutes pressure in a standard hydraulic steam heated press.

The peel adhesion of the polyethylene film sheet to the substrate was measured according to ASTM D-903 on a Scott tensile tester in the following manner:

A one inch wide strip was cut across the polyethylene and down to the substrate. The strip was then peeled from the substrate at a constant rate of one inch/minute and the force required measured in pounds/inch.

Results with two polyisocyanates are given in Table III below.

TABLE III.—VIRGIN POLYETHYLENE REACTED WITH POLYISOCYANATES

| Example | Diisocyanate | Percent | Peel Strength (lbs./in.) Virgin [1] 0.04 [2] 0.0002 |
|---|---|---|---|
| 1A | TDI | 6 | <1 >40 |
| 1B | DADI | 6 | >40 >40 |

[1] Peroxide, mg./gm.
[2] Carbonyl absorbance/mil.

Example 2.—Improvement in adhesion properties of virgin ethylene/propylene copolymers by reacting with polyisocyanates The procedure of Example 1 was followed except that an ethylene/11% propylene copolymer was used in place of polyethylene.

Results are given in Table IV below.

TABLE IV.—VIRGIN ETHYLENE/PROPYLENE COPOLYMER AND POLYISOCYANATES

| Example | Diisocyanate | Percent | Peel Strength (lbs./in.) Virgin [1] 0.04 [2] 0.0002 |
|---|---|---|---|
| 2A | DADI | 6 | 3 21 |

[1] Peroxide, mg./gm.
[2] Carbonyl absorbance/mil.

Example 3.—Improvements in adhesion of virgin polyethylene to synthetic resin substrates by reacting with polyisocyanates The procedure of Example 1 was followed except that Mylar (trademark of E. I. du Pont de Nemours for polyethylene terephthalate copolymer) and nylon were used as substrates in place of cold rolled steel.

Results are given in Table V.

TABLE V.—VIRGIN POLYETHYLENE AND POLYISOCYANATES

| Example | Peroxide Content, mg./gm. | Carbonyl Absorbance per mil | Diisocyanate, 6% | Substrate Peel Strength (lbs./in.) Mylar (film) 5 mil | Nylon (film) 20 mil |
|---|---|---|---|---|---|
| 3A | 0.04 | 0.0002 | | 1 | 1 |
| 3B | 0.04 | 0.0002 | DADI | 2-3 | |
| | 0.04 | 0.0002 | TDI | | 4 |

The polyisocyanate reacted polyethylenes are improved in adhesion over virgin polyethylenes which have not been reacted with a polyisocyanate.

Examples 4–12.—Use of various polyisocyanates with virgin polyethylene

Adhesive properties were imparted to virgin polyethylenes by reacting with

| | Example |
|---|---|
| Bitolylene diisocyanate | 4 |
| Dianisidine diisocyanate | 5 |
| Mondur [1] | 6 |
| m-Xylylene diisocyanate | 7 |
| Polymethylene polyphenyl isocyanate | 8 |
| 2,4-toluene diisocyanate | 9 |
| Nacconate 300 [2] | 10a |
| Nacconate 310 [3] | 10b |

[1] See Table VII.
[2] Diphenyl methane-4,4' diisocyanate.
[3] 3,3'-dimethyldiphenyl methane-4,4' diisocyanate.

In each example, 6 parts of the polyisocyanate were milled ten end passes at 110° C. on a two roll mill with 94 parts of the virgin polyethylene (melt index 2.0, density 0.9196).

A 20 mil thick section was stripped off the mill and compression molded at 500 p.s.i. and 110° C. for 5 minutes. The sheet was then placed between two layers of stainless steel (35 mil Type 302) and the assembly was placed in a press at 170° C. and 500 p.s.i. for 5 minutes. Adhesion was qualitatively tested immediately and after immersing the test specimens for 6 hours in boiling water. In testing the panels were attempted to be delaminated by hand. Inseparable laminates were rated excellent; separable laminates were rated fair to poor or poor depending on the ease of delamination. Results were as follows. A control, the same treatment of the polyethylene without any polyisocyanate is also given.

TABLE VII

| Example | Bond Strength | |
|---|---|---|
| | Immediately | After 6 hours/212° F. H₂O |
| Control | Fair-Poor | Poor |
| 4 | Excellent | Excellent |
| 5 | Excellent | Excellent |
| 6 | Excellent | Excellent |
| 7 | Excellent | Excellent |
| 8 | Excellent | Excellent |
| 9 | Excellent | Excellent |
| 10a | Excellent | Excellent |
| 10b | Excellent | Excellent |

Examples 11–19.—Adhesion of polyisocyanate modified polyethylene to various substrates The olefin polymer adhesive used was virgin polyethylene milled with 1% by weight dianisidine diisocyanate in the manner of Example 4. Laminates were prepared as in Example 4. All laminates formed were nondelaminable by hand pressure.

Example 11.—35 mil stainless steel/polyethylene/35 mil stainless steel

Example:
11—10 mil copper/polyethylene/10 mil copper
12—3 mil aluminum/polyethylene/3 mil aluminum
13—40 mil GRS rubber/polyethylene/40 mil GRS rubber
14—40 mil birch veneer plywood/polyethylene/40 mil birch veneer plywood
15—3 mil aluminum/10 mil polyethylene/40 mil birch veneer plywood
16—cotton cloth/polyethylene/cotton cloth
17—20 mil polyethylene [1]/polyethylene/polyethylene
18—20 mil vinyl chloride-vinyl acetate copolymer/polyethylene/vinyl chloride-vinyl acetate copolymer
19—Portland cement block/polyethylene/portland cement block

[1] Density 0.916, melt index 20.

Examples 20–38

A number of olefin polymer polyisocyanate compositions were prepared as in Example 4 and milled to a 10 mil thickness. These sheets were then used to bond 20 mil virgin high density polyethylene (density 0.945, melt index 1.2) to stainless steel (35 mil Type 302). The laminates were prepared by placing the adhesive olefin polymer sheet between the polyethylene sheet and the steel panel and compression mold heating the assembly for 10 minutes at 170° C. and 500 p.s.i. pressure.

Testing of adhesion was on a Scott tensile tester. Adhesion greater than 40 p.s.i. could not be measured since polyethylene fails at this pressure. Results and experimental data are summarized in the following table.

Examples 39–42.—Effect of time and temperature on adhesive bond strength

Example 4 was duplicated but varying the bonding conditions to

Example 39, 120° C. for 2 minutes. Peel strength was 17 pounds/inch;
Example 40, 120° C. for 120 minutes. Peel strength was 39 pounds/inch;
Example 41, 170° C. for 10 minutes. Peel strength was 35 pounds/inch;
Example 42, 200° C. for 2 minutes. Peel strength was over 40 pounds/inch.

Example 43

A polyethylene having a density of 0.916 and a melt index of 2.1 is blended with 6 parts of 2,4-toluene diisocyanate per 94 parts by weight of the polyethylene in an extruder and the blend is extruded at 160° C. onto aluminum foil to a thickness of one mil. Adhesion is excellent.

Example 44

Polyethylene having a density of 0.920 and a melt index of 2.1, 94 parts is dissolved in s-tetrachloroethane and 6 parts of 2,4-toluene diisocyanate is added. The solution is coated onto stainless steel panels to a thickness of one mil cured at 150° C. Adhesion is excellent.

Example 45.—Adhesion of poly(butene-1)

Example 15 aws duplicated but using ninety-nine parts of poly(butene-1) and one part DADI. The composition was sheeted and laminated between 3 mil aluminum foil and 40 mil birch veneer. Testing was carried out as in Examples 4–10. No delamination by hand was possible.

TABLE VIII

| Example | Polyisocyanate | Percent | Steel-Polyethylene Laminate—Interlayer | Peel Strength lbs/in. (ASTM D-903) |
|---|---|---|---|---|
| Control I | TDI [1] | 0 | Polyethylene | <1 |
| 20 | TDI | 1/100 | do | 1–2 |
| 21 | TDI | 1/8 | do | 12 |
| 22 | TDI | 1/4 | do | 19 |
| 23 | TDI | 1/2 | do | 35 |
| 24 | TDI | 6 | do | >40 |
| 25 | TDI | 20 | do | >40 |
| 26 | DADI [2] | 1/2 | do | 28 |
| 27 | DADI | 1 | do | >40 |
| 28 | PAPI [3] | 1 | do | >40 |
| 29 | Mondure S [4] | 1 | do | >40 |
| 30 | BDI [5] | 1 | do | >40 |
| Control II | DADI [2] | 0 | Ethylene/11% Propylene Copolymer, 1.2 Melt Index. | <1 |
| 31 | DADI | 1/2 | | 21 |
| 32 | DADI | 6 | | >40 |
| Control III | DADI | 0 | Ethylene/Vinyl Acetate Copolymer, 2.2 Melt Index, 1.5 Mole percent vinyl acetate in Feed. | 2–3 |
| 33 | DADI | 1/2 | | 38 |
| 34 | DADI | 6 | | >40 |
| Control IV | DADI | 0 | Ethylene/30% Vinyl Acetate Copolymer. | 5 |
| 35 | DADI | 1/8 | | 21 |
| 36 | DADI | 1/2 | | >40 |
| Control V | DADI | 0 | High Density Polyethylene (1.6 Melt Index, 0.964 Density). | <1 |
| 37 | DADI | 1 | | 29 |
| Control VI | DADI | 0 | Polypropylene (2.6 Melt Index 0.902 Density). | <1 |
| 38 | DADI | 1 | | 13 |

[1] 2,4-toluene diisocyanate.
[2] Dianisidine diisocyanate.
[3] Polymethylene polyphenyl isocyanate.
[4] Reaction product of one mole trimethylolpropane, 3 moles toluene diisocyanate and 3 moles of phenol.
[5] Bitolylene diisocyanate.

Consideration of Table VIII reveals the wide range of olefin polymers, polyisocyanate concentrations, and polyisocyanates providing good adhesives according to the present invention.

Example 46.—Adhesion of styrene polymer to polyethylene (density 0.95)

Example 17 was duplicated but substituting as the interlayer, a styrene polymer and using 1 part DADI and 99 parts polymer. No delamination by hand was possible.

Example 47.—Adhesion of styrene/propylene copolymer to polyethylene (density 0.95)

Example 46 was duplicated but using a styrene/propylene copolymer in place of the styrene polymer. No delamination by hand was possible.

As indicated above a further aspect of the present invention is the improvement in physical properties of olefin polymers by the conjoint use of organic peroxides and polyisocyanates, which improvements are not associated with drawbacks of peroxide crosslinking heretofore known in the art and above mentioned. Importantly, there is a synergistic improvement in the adhesional properties of olefin polymers using organic peroxides and polyisocyanates together, over either used separately.

In the compositions now being described the use of relatively low amounts of polyisocyanate is quite possible and is in fact, preferred. In these compositions, from 0.25 to 40% by weight of the polyisocyanate is useful, but 0.25% to 10% by weight of the polyisocyanate is ordinarily sufficient, and 0.5 to 6% is preferred, particularly 1 to 2%, in combination with from 0.25% to 3%, preferably from 0.5 to 2%, by weight of an organic peroxide.

The adhesional improvement is noted in both virgin and oxidized olefin polymers. Solvent resistance and tensile strength of olefin polymers as well as adhesion are improved when the polymers are oxidized to levels above described prior to reaction with the polyisocyanate and the peroxide.

The ratio of polyisocyanate and peroxide is not critical in these compositions. Generally the lower the amount of polyisocyanate, the higher desirably is the peroxide concentration. Typical combinations are:

Polyisocyanate, percent:         Organic peroxide, percent
>0.25 _____ >0.25–3
1.0 _____ 0.25–3
0.25–40 _____ 0.5

Preferred levels of oxidation in the olefin polymers for these compositions are:
Peroxide _____ mg./gm__ 1.2–2.3
Carbonyl _____ absorbence/mil__ 0.0016–0.013

Organic peroxides useful in the present invention are, generally, compounds composed of carbon, hydrogen and oxygen, and have the general formula $R^1OOR^2$ wherein $R^1$ is an organic radical and $R^2$ is an organic radical or hydrogen. $R^1$ and $R^2$ can be hydrocarbon radicals or organic radicals substituted with a great variety of substitutents.

Preferred classes include alkyl peroxides e.g. t-butyl peroxide, alkyl esters of organic peracids e.g. t-butyl perbenzoate, and aryl substituted alkyl peroxides e.g. dicumyl peroxide. Specific compounds illustrative of these and other classes of organic peroxides are:

Cumene hydroperoxide
Di-tert-butyl peroxide
Dimethyl peroxide
Tetralyl hydroperoxide
n-Octyl hydroperoxide
Diethyl peroxide
t-Butyl hydroperoxide
t-Butyl perbenzoate
t-Butyl peracetate
Peracetic acid
Dibenzoyl peroxide
Bis(p-chlorobenzoyl)peroxide
Cyclohexanone peroxide
Diacetyl peroxide
Hyroxyheptyl peroxide
Dibutryl peroxide
Dipropionyl peroxide
Dioctanoyl peroxide
Dilauroyl peroxide
Diisopropyl peroxydicarbonate
Bis(heptafluorobutyryl) peroxide
Bis (2,4-dichlorobenzoyl)peroxide
p-Menthane hydroperoxide
Pinane hydroperoxide
Dicumyl peroxide
Di-t-butyl diperphthalate
t-Butyl peroxyisobutyrate
Methyl ethyl ketone peroxide
2,5-dimethylhexane-2,5-dihydroperoxide and other organic peroxides such as are well known to those in the art.

Examples 48–49.—Improvement in adhesion properties of oxidized polyethylene by reacting with polyisocyanates and organic peroxides Ethylene homopolymer having a density of 0.92 and a melt index of 2.1 was oxidized and mixed with 0.5% of a diisocyanate (Control I), 0.5% of a peroxide (Control II) and mixed with 0.5% of a diisocyanate and 0.5% of an organic peroxide (Examples 48 and 49), in the manner of Example 1. A 20 mil film was removed from the rolls and placed between a 20 mil thick sheet of polyethylene and a solvent washed, cold rolled steel panel. The assembly was placed between cellophane wrapped polished platens and cured under 100–200 pounds/sq. in. at 170° C. for 10 minutes in a standard hydraulic steam heated press.

The peel adhesion of the polyethylene sheet was measured according to ASTM D–903 in the manner of Example 1.

Results are given in Table IX below.

TABLE IX.—OXIDIZED POLYETHYLENE REACTED WITH POLYISOCYANATES AND PEROXIDES

| Example | Diisocyanate | Percent | Dicumyl Peroxide, percent | Virgin 0.04 0.002 | Oxidized [1] 1.9 0.008 |
|---|---|---|---|---|---|
| Control IA | DADI | 0.5 | 0 | --------- | 28–29 |
| Control IB | TDI | 0.5 | 10 | --------- | 35 |
| Control II | | 0 | 0.5 | --------- | 8 |
| Control III | | 0 | 0 | <1 | 3 |
| 48 | DADI | 0.5 | 0.5 | --------- | >40 |
| 49 | TDI | 0.5 | 0.5 | --------- | >40 |

[1] Sample milled 45 minutes in air at 170° C.

Example 50.—Improvement in adhesion of virgin ethylene propylene copolymer by reacting with polyisocyanates and peroxides The procedure of Examples 48 and 49 was followed except that the ethylene/propylene copolymer of Example 2 was used, both as a virgin polymer and an oxidized polymer in place of the polyethylene.

Results are given in Table X below.

TABLE X.—VIRGIN AND OXIDIZED ETHYLENE/PROPYLENE COPOLYMERS REACTED WITH POLYISOCYANATES AND ORGANIC PEROXIDES

| Example | Diisocyanate | Percent | Dicumyl Peroxide, percent | Peel Strength (lbs./in.) Virgin [2] 0.02 [3] 0.003 | Oxidized [1] [2] 0.2 [3] 0.0013 |
|---|---|---|---|---|---|
| Control I | | 0 | 0 | 1 | ------------ |
| Control II | | 0 | 1.0 | 6–8 | ------------ |
| Control III | DADI | 6 | | 21 | ------------ |
| Control IV | | 0 | | | 2–3 |
| Example 50 | DADI | 6 | 1.0 | 35 | ------------ |

[1] Sample milled in air 45 minutes at 170° C.
[2] Peroxide, mg./gm.
[3] Carbonyl absorbance/mil.

Examples 51–52.—Adhesion of polyisocyanate and peroxide modified polyethlene to various substrates The procedure of Examples 48 and 49 was followed except that Mylar and nylon were used as substrates in place of cold rolled steel panels.

Results are given in Table XI.

TABLE XI.—OXIDIZED POLYETHYLENE AND POLYISOCYANATE AND PEROXIDE

| Example | Peroxide Content, mg./gm. | Carbonyl Absorbance per mil | Diisocyanate, Percent | Dicumyl Peroxide, Percent | Peel Strength Substrate | |
|---|---|---|---|---|---|---|
| | | | | | Mylar film (5 mil) | Nylon film (20 mil) |
| Control I | 2.2 | 0.008 | | | 1-2 | |
| Control II | 2.2 | 0.008 | 0 | 1 | 12 | |
| Control III | 2.2 | 0.008 | 6 | 0 | 4-5 | |
| Example 51 | 2.2 | 0.008 | 6 | 1 | 40 | |
| Control I | 2.2 | 0.008 | | | | 4 |
| Control II | 2.2 | 0.008 | 0 | 1 | | 4.5 |
| Control III | 2.2 | 0.008 | 6 | 0 | | 11 |
| Example 52 | 2.2 | 0.008 | 6 | 1 | | 17 |

As further broadly pointed out above olefin polymers containing hydroxyl (—OH) groups in their structures are crosslinked to advantage by polyisocyanates. Specifically, improvements are obtained in such olefin polymers which contain at least 50 percent by weight of a combined alpha monoethylenically unsaturated hydrocarbon having from 2 to 4 carbon atoms, inclusive, preferably ethylene and up to 50 percent by weight of one or two monomers copolymerizable with ethylene and which contain an hydroxyl group. These olefin polymers suitably have a melt index (ASTM 1238–57T) in the range of 0 to 1000 and preferably in the range of 0.02 to 100 decigrams/minute. Examples of the olefin polymers, illustrative of the class are: ethylene/formaldehyde copolymers; hydrolyzed ethylene/vinyl formate copolymers; hydrolyzed ethylene/vinyl acetate copolymers; and terpolymers of similar comonomers, all containing a minimum of 50 percent combined ethylene, propylene or butene-1. These hydroxyl containing olefin polymers contain from 0.5 to 21 percent by weight hydroxyl groups and preferably from 1 to 10 percent by weight hydroxyl groups.

The improvements obtained in these olefin polymers by modification with polyisocyanates are in many respects similar to improvements obtained in the hereinabove described olefin polymer e.g. increased adhesionability, improved solvent resistance and clarity, excellent stress crack resistance, increased molecular weight, improved tensile properties and impact strength.

In the hydroxyl containing olefin polymer compositions now being described, the concentration of polyisocyanate is suitable within the limits set out above and is preferably in the range of 0.01 to 30 parts, particularly from 1 to 15 parts of the polyisocyanate per 100 parts of the hydroxyl containing olefin polymer.

In the following examples the hydroxyl containing olefin polymer was fluxed on a two-roll mill at about 110° C., except that olefin polymers containing 6 and 15 percent by weight hydroxyl groups were milled at 50° C. The polyisocyanate was milled in for about 10 minutes, including 10 end passes to assure complete dispersion of the additive. Compression molded plaques (20 mils thick) were prepared by curing at a temperature and for a time indicated in each example.

The various hydroxyl containing olefin polymers were prepared by directly polymerizing ethylene with an hydroxyl group containing monomer, such as formaldehyde or by complete or partial hydrolysis of a copolymer of ethylene and an ester e.g. ethylene/vinyl acetate copolymer hydrolyzed or ethylene/vinyl formate copolymer hydrolyzed.

Example 53

An ethylene/vinyl formate copolymer having a melt index of 9.7 and a density of 0.950 was hydrolyzed to an hydroxyl content of 1.5 percent by weight and modified with 3 percent TDI. Cure was at 150° C. for 60 minutes. Properties of the copolymer before and after modification were as follows.

Flow Index:
  Before _____ 139
  After _____ 0

Percent Gel:
  Before _____ 0
  After _____ 79

Example 54

Example 53 was duplicated but using 3% of DADI. Properties were:

Flow Index:
  Before _____ 139
  After _____ 0

Percent Gel:
  Before _____ 0
  After _____ 72

Example 55

Example 53 was duplicated but using 6% of a phenol-blocked polyisocyanate (Mondur S) and an ethylene/24% vinyl acetate copolymer partially hydrolyzed to an hydroxyl content of 3.2 percent by weight. Cure was at 180° C. for 30 minutes. Properties were:

Flow Index:
  Before _____ >200
  After _____ 25

Percent Gel:
  Before _____ 0
  After _____ 54

Examples 56–59

Example 53 was duplicated but using various amounts of TDI. Results are summarized in Table XII.

TABLE XII

| Example | Percent TDI | Flow Index | | Percent Gel | |
|---|---|---|---|---|---|
| | | Before | After | Before | After |
| 56 | 0.01 | 139 | 116 | 0 | |
| 57 | 0.1 | 139 | 29 | 0 | 11 |
| 58 | 1 | 139 | 0 | 0 | 64 |
| 59 | 10 | 139 | 0 | 0 | 99 |

Example 60

Example 53 was duplicated but using 10% TDI and curing at 100° C. for 5 minutes. Flow index was reduced from 139 to 0; percent gel was 77%.

Example 61

Example 53 was duplicated but using 3% TDI and a completely hydrolyzed ethylene/vinyl acetate copolymer (containing 1.9% OH analyzed by the 2.8 mg. infrared band). Cure was at 150° C. for 60 minutes. Flow index was reduced from 32 to 0; percent gel was 79%; stress cracking resistance ($F_{50}$) was increased from 0.2 hour to over 500 hours; and cloudiness was changed to clarity.

Example 62

Example 61 was duplicated but using an ethylene/10.1% vinyl acetate copolymer hydrolyzed to 2.1% hydroxyl content and 6% Mondur S. Flow index was reduced from 298 to 0; percent gel was 73%; tensile impact was increased from 184 foot-lbs./cubic in. to 737 foot-lbs./cubic in.

Example 63

Example 61 was duplicated but using the ethylene/vinyl formate copolymer of Example 53. Flow index was reduced from 139 to 0; percent gel was 79%; stress cracking resistance ($F_{50}$) was increased from 0.1 hour to over 500 hours, and cloudiness was changed to clarity.

Example 64

Example 53 was duplicated but using an ethylene/vinyl formate copolymer completely hydrolyzed to an hydroxyl content of 0.5 percent. Flow index was reduced from 112 to 0; percent gel was 41%.

Example 65

Example 53 was duplicated but using an ethylene/formaldehyde copolymer having a melt index of 10,000 and containing 5% by weight hydroxyl groups and 1% of TDI. Flow index was reduced from 200 to 0; percent gel was 91%.

Example 66

Example 65 was duplicated but using an ethylene/formaldehyde copolymer having a melt index of 10,000 and containing 14% by weight hydroxyl groups. Flow index was reduced from 200 to 0; percent gel was 75%.

Example 67

Example 65 was duplicated but using an ethylene/formaldehyde copolymer having a density of 0.931, a melt index of 15 and having an hydroxyl content of 1%. Gel was increased to 81%.

I claim:

1. Adhesive consisting of the reaction product of (1) virgin olefin polymers selected from the group consisting of (a) virgin olefin homopolymers of monoethylenically unsaturated hydrocarbons, (b) virgin olefin copolymers of a monoethylenically unsaturated hydrocarbon and a compound selected from the group consisting of carbon monoxide, styrene, vinyl stearate, butene, vinyl acetate, vinyl formate, methyl acrylate, 2-ethyl hexyl acrylate, N-methyl-N-vinyl acetamide, ethyl acrylate, isoprene, butadiene, acrylamide, vinyl triethoxysilane, bicycloheptene, bicycloheptadiene and divinyl phosphonate, and (c) virgin olefin copolymers of at least two different monoethylenically unsaturated hydrocarbons and (2) from 0.01 to 40% by weight based on the weight of the virgin olefin polymer of an organic isocyanate having at least two —NCO groups.

2. Adhesive of claim 1 wherein said virgin olefin polymer is polyethylene.

3. Adhesive of claim 1 wherein said virgin olefin polymer is an ethylene-propylene copolymer.

4. Adhesive of claim 1 wherein said virgin olefin polymer is an ethylene-vinyl acetate copolymer.

5. Adhesive of claim 1 wherein said virgin olefin polymer is polypropylene.

6. Adhesive consisting of the reaction product of (1) an olefin polymer selected from the group consisting of (a) virgin olefin homopolymers of monoethylenically unsaturated hydrocarbons, (b) virgin olefin copolymers of a monoethylenically unsaturated hydrocarbon and a compound selected from the group consisting of carbon monoxide, styrene, vinyl stearate, butene, vinyl acetate, vinyl formate, methyl acrylate, 2-ethyl hexyl acrylate, N-methyl-N-vinyl acetamide, ethyl acrylate, isoprene, butadiene, acrylamide, vinyl triethoxysilane, bicycloheptene, bicycloheptadiene and divinyl phosphonate, (c) virgin olefin copolymers of at least two different monoethylenically unsaturated hydrocarbons, (d) oxidized olefin polymers having a peroxide content of from 0.15 to 3.5 milligrams per gram resin and containing at least 10 percent by weight of a monoethylenically unsaturated hydrocarbon containing from 2 to 4 carbon atoms inclusive, and (2) from 0.01 to 40% by weight based on the weight of the olefin polymer of an organic isocyanate having at least two —NCO groups and (3) from 0.25 to 3% by weight based on the weight of the olefin polymer of an organic peroxide.

7. Adhesive of claim 6 wherein said olefin polymer is polyethylene.

8. Adhesive of claim 6 wherein said olefin polymer is an ethylene-propylene copolymer.

9. Adhesive of claim 6 wherein said virgin olefin polymer is polypropylene.

References Cited

UNITED STATES PATENTS

| | | | |
|---|---|---|---|
| 2,565,783 | 8/1951 | Sehouteden | 260—77.5 |
| 2,690,780 | 10/1954 | Cousins | 260—77.5 |
| 2,826,570 | 3/1958 | Ivett | 260—77.5 |
| 2,833,740 | 5/1958 | Verbanc | 260—63 |
| 2,839,478 | 6/1958 | Wilms et al. | 260—2.5 |
| 3,027,343 | 3/1962 | Kane | 260—77.5 |
| 3,171,830 | 3/1965 | Kehr | 260—88.2 |
| 3,179,716 | 4/1965 | Bruin et al. | 260—878 |
| 3,210,323 | 10/1965 | Bush et al. | 260—77.5 |
| 3,225,119 | 12/1965 | Baker | 260—874 |
| 3,228,793 | 1/1966 | Stemmer et al. | 260—77.5 |
| 3,234,197 | 2/1966 | Baum | 260—93.7 |
| 3,296,210 | 1/1967 | Wilson et al. | 260—73 |
| 3,317,477 | 5/1967 | Wilson et al. | 260—73 |
| 2,373,561 | 4/1945 | Hanford | 260—67 |

FOREIGN PATENTS 581,279   10/1946   Great Britain.

OTHER REFERENCES

Renfrew, Polythene (1960), pages 390–391 relied upon.
Angewandte Chemie, volume 73, Number 6 (Mar. 21, 1961), pages 177–186 relied upon.

DONALD E. CZAJA, *Primary Examiner.*

F. McKELVEY, M. C. JACOBS, *Assistant Examiners.*